United States Patent
Carrier et al.

(10) Patent No.: US 7,075,257 B2
(45) Date of Patent: Jul. 11, 2006

(54) METHOD AND DEVICE FOR BRAKING A MOTOR

(75) Inventors: David A. Carrier, Aberdeen, MD (US); Bhanuprasad V. Gorti, Abingdon, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 10/972,964

(22) Filed: Oct. 22, 2004

(65) Prior Publication Data

US 2005/0052145 A1    Mar. 10, 2005

Related U.S. Application Data

(63) Continuation-in-part of application No. 10/647,807, filed on Aug. 25, 2003.

(60) Provisional application No. 60/419,352, filed on Oct. 18, 2002.

(51) Int. Cl.
*H02P 3/12*    (2006.01)

(52) U.S. Cl. .................. 318/375; 318/376; 318/466; 318/470; 318/467; 318/468; 318/469

(58) Field of Classification Search ............... 318/375, 318/376, 466, 470, 467, 468, 469, 362, 381, 318/368, 459, 447, 455, 453; 360/73.03
See application file for complete search history.

(56) References Cited

U.S. PATENT DOCUMENTS

| | | | |
|---|---|---|---|
| 3,611,092 A | 10/1971 | Wilmunder | |
| 3,732,475 A | 5/1973 | Geerling | |
| 3,947,740 A | 3/1976 | Tsuboi | |
| 4,144,482 A | 3/1979 | Schwab | |
| 4,669,841 A * | 6/1987 | Kaneko et al. ............. 352/216 |
| 4,933,609 A | 6/1990 | Clark | |
| 5,449,992 A | 9/1995 | Geiger et al. | |
| 5,505,043 A | 4/1996 | Baginski et al. | |
| 5,600,217 A | 2/1997 | Bartlett | |
| 5,644,112 A | 7/1997 | Geiger et al. | |
| 5,659,231 A | 8/1997 | Svarovsky et al. | |
| 5,764,021 A | 6/1998 | Gutsche | |
| 5,892,885 A | 4/1999 | Smith et al. | |
| 5,913,373 A | 6/1999 | Forrest | |
| 6,005,359 A * | 12/1999 | Brambilla et al. .......... 318/368 |
| 6,013,993 A | 1/2000 | Barbisch | |
| 6,078,156 A | 6/2000 | Spurr | |
| 6,078,157 A | 6/2000 | Seiler et al. | |
| 6,084,366 A | 7/2000 | Koselke et al. | |
| 6,118,241 A | 9/2000 | Kazlauskas | |
| 6,160,368 A | 12/2000 | Plutowski | |
| 6,170,241 B1 | 1/2001 | Shibilski et al. | |
| 6,188,192 B1 | 2/2001 | Chen | |
| 6,236,177 B1 | 5/2001 | Zick et al. | |
| 6,237,390 B1 | 5/2001 | Honsel et al. | |
| 6,310,452 B1 | 10/2001 | Deck et al. | |
| 6,373,207 B1 | 4/2002 | Yablonovitch | |

(Continued)

FOREIGN PATENT DOCUMENTS

AT    391 384    9/1990

(Continued)

*Primary Examiner*—Karen Masih
(74) *Attorney, Agent, or Firm*—Harness, Dickey & Pierce, P.L.C.

(57) ABSTRACT

A method and apparatus for braking a motor has a braking circuit that intermittently shorts the windings of the motor to brake the motor. The braking circuit is powered by back EMF generated by the motor when power is disconnected from the motor.

45 Claims, 5 Drawing Sheets

U.S. PATENT DOCUMENTS

| | | |
|---|---|---|
| 6,448,727 B1 | 9/2002 | Rotterhusen |
| 6,486,625 B1 | 11/2002 | Vilou |
| 6,525,495 B1 | 2/2003 | Bianchi |
| 6,536,536 B1 | 3/2003 | Gass et al. |
| 6,548,973 B1 * | 4/2003 | Chloupek et al. ............ 318/375 |
| 6,680,596 B1 | 1/2004 | DeCicco |
| 6,686,719 B1 | 2/2004 | Cochoy et al. |
| 6,741,050 B1 | 5/2004 | Wissmach et al. |
| 6,741,051 B1 | 5/2004 | Chu |
| 2002/0158593 A1 | 10/2002 | Henderson et al. |
| 2003/0117095 A1 | 6/2003 | Gorti |
| 2004/0037548 A1 * | 2/2004 | Higuma ..................... 396/133 |
| 2004/0041531 A1 | 3/2004 | Chu |
| 2004/0066159 A1 * | 4/2004 | Zack et al. ................. 318/362 |
| 2004/0207351 A1 | 10/2004 | Hahn et al. |

FOREIGN PATENT DOCUMENTS

| | | |
|---|---|---|
| DE | 25 19 509 | 5/1975 |
| DE | 33 24 483 | 1/1985 |
| DE | 234 254 | 3/1986 |
| DE | 3539841 | 3/1987 |
| DE | 3636555 | 5/1988 |
| DE | 3546606 | 3/1990 |
| DE | 40 22 637 | 1/1992 |
| DE | 4022637 | 1/1992 |
| DE | 40 38 199 | 6/1992 |
| DE | 4227719 | 6/1993 |
| DE | 42 01 005 | 7/1993 |
| DE | 4200983 | 7/1993 |
| DE | 4200984 | 7/1993 |
| DE | 4200996 | 7/1993 |
| DE | 4201005 | 7/1993 |
| DE | 42 07 362 | 9/1993 |
| DE | 4223216 | 1/1994 |
| DE | 4232402 | 3/1994 |
| DE | 4235774 | 4/1994 |
| DE | 44 29 962 | 2/1996 |
| DE | 195 40 740 | 8/1996 |
| DE | 42 44 805 | 9/1999 |
| DE | 19937786 | 2/2000 |
| DE | 199 59 785 | 6/2001 |
| DE | 10222540 | 11/2003 |
| EP | 0 328 536 | 8/1989 |
| EP | 0 551 895 | 7/1993 |
| EP | 0 551 896 | 7/1993 |
| EP | 0 551 909 | 7/1993 |
| EP | 0 740 407 | 10/1996 |
| EP | 1 385 261 | 1/2004 |
| JP | 49-079000 | 7/1974 |
| JP | 50-032423 | 3/1975 |
| JP | 52-033025 | 3/1977 |
| JP | 52-156326 | 12/1977 |
| JP | 53-006815 | 1/1978 |
| JP | 53-035116 | 4/1978 |
| JP | 54-037214 | 3/1979 |
| JP | 55-117480 | 9/1980 |
| JP | 56-060750 | 5/1981 |
| JP | 57-027791 | 2/1982 |
| JP | 57-170084 | 10/1982 |
| JP | 58-015473 | 1/1983 |
| JP | 58-31791 | 3/1983 |
| JP | 58-175980 | 10/1983 |
| JP | 58-190290 | 11/1983 |
| JP | 60-046785 | 3/1985 |
| JP | 61-295885 | 12/1986 |
| JP | 62-053189 | 3/1987 |
| JP | 62-254679 | 11/1987 |
| JP | 63-039482 | 2/1988 |
| JP | 63-059213 | 3/1988 |
| JP | 04-178192 | 6/1992 |
| JP | 04-208085 | 7/1992 |
| JP | 05-184174 | 7/1993 |
| JP | 06-038565 | 2/1994 |
| JP | 11-215871 | 8/1999 |
| JP | 2003-088150 | 3/2003 |
| JP | 2003-250286 | 9/2003 |
| WO | WO 92/05626 | 4/1992 |

* cited by examiner

METHOD AND DEVICE FOR BRAKING A MOTOR

CROSS-REFERENCE TO RELATED APPLICATIONS

This application is a continuation-in-part of U.S. patent application Ser. No. 10/647,807 filed on Aug. 25, 2003, which claims the benefit of U.S. Provisional Application No. 60/419,352 filed Oct. 18, 2002.

FIELD OF THE INVENTION

The present invention relates to motor braking, and more particularly, to braking a DC motor in power tools.

BACKGROUND OF THE INVENTION

Braking of a DC motor in a power tool is typically accomplished by closing brake contacts across the motor windings after the trigger of the switch that switches power to the motor windings is released. This technique presents a number of problems. It results in very high currents during braking. It may also result in demagnetization of the field magnet as well as accelerating brush wear. It also results in sudden braking, which can be detrimental to the life of the tool transmission. The brake times are also not controllable.

An alternate approach is to connect power resistors across the motor windings during braking. This approach also presents problems. The power resistors are bulky and generate heat. The power resistors typically cannot be packaged in the same package as the switch that switches power to the motor windings, which houses the components for switching power on and off to the motor windings during normal tool operation. Even though the brake currents are lower, the brake times are not controllable by this approach.

Figure 1:
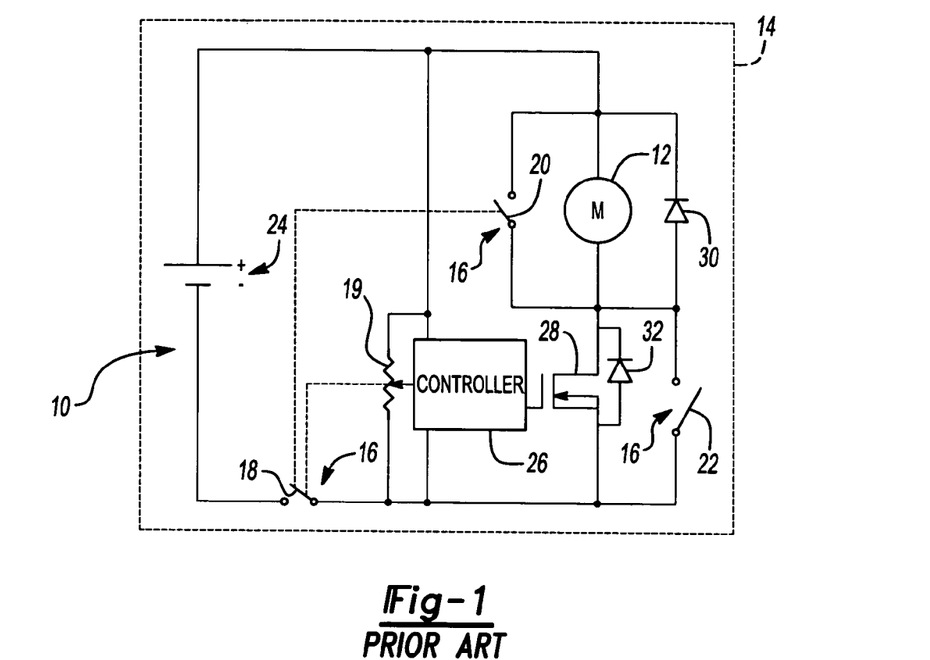
FIG. 1 is a schematic of a prior art motor control circuit in a cordless power tool.

FIG. 1 shows a prior art motor control circuit 10 for controlling power to a motor 12 in a cordless power tool electrical system 14 (shown representatively by dashed box 14). Cordless power tool electrical system 14 is illustratively a variable speed system, such as would be used in a variable speed drill. Motor 12 illustratively has a permanent magnet field and a wound armature. Motor control circuit 10 includes a power switch 16, illustratively a trigger switch, having main power contacts 18, braking contacts 20 and bypass contacts 22. Main power contacts 18 and braking contacts 20 are linked so that they operate in conjunction with each other. Main power contacts 18 are normally open and braking contacts 20 are normally closed and both are break-before-make contacts. The normally open side of main power contacts 18 is connected to the negative terminal of a battery 24 and the common side of main power contacts 18 is connected to controller 26 of motor control circuit 10. Motor control circuit 10 also includes run power switching device 28 and free wheeling diode 30.

Run power switching device 28 is illustratively a N-channel MOSFET with its gate connected to an output of controller 26, its source connected to the common side of main power contacts 18 and its drain connected the common side of braking contacts 20 of trigger switch 16, to one side of the windings of motor 12 and to the anode of diode 30. As is known, MOSFETs have diodes bridging their sources and drains, identified as diode 32 in FIG. 1. The other side of braking contacts 20 is connected to the positive side of battery 24 as is the other side of the windings of motor 12 and the cathode of diode 30. Since motor 12 is illustratively a wound armature/permanent magnet field motor, the motor windings to which the drain of run power switching device 28 and the positive side of battery 24 are connected are the armature windings.

Controller 26 is illustratively a pulse width modulator that provides a pulse width modulated signal to the gate of run power switching device 28 having a set frequency and a variable duty cycle controlled by a variable resistance. The variable resistance is illustratively a potentiometer 19 mechanically coupled to trigger switch 16. In this regard, controller 26 can be a LM 555 and potentiometer, the LM 555 configured as a pulse width modulator having a set frequency and a variable duty cycle controlled by the potentiometer that is mechanically coupled to trigger switch 16.

In operation, trigger switch 16 is partially depressed, opening braking contacts 20 and closing, a split second later, main power contacts 18. This couples power from battery 24 to controller 26, to the source of run power switching device 28 and to bypass contacts 22 (that remain open at this point). Controller 26 generates a pulse width modulated signal at the gate of run power switching device 28, cycling it on and off. Run power switching device 28 switches power on and off to the windings of motor 12 as it cycles on and off. The duty cycle of the pulse width modulated signal, that is, how long it is high compared to how long it is low, provided at the gate of run power switching device 28 is determined by how far trigger switch 16 is depressed. (How far trigger switch 16 is depressed determines the variable resistance of the potentiometer 19 mechanically coupled to it that provides the variable resistance used to set the duty cycle of controller 26.) The duty cycle of the pulse width modulated signal determines the speed of motor 12. As trigger switch 16 is depressed further, bypass contacts 22 close, typically when trigger switch 16 is depressed to about the eighty percent level. When bypass contacts 22 close, power is connected directly from the battery 24 to the motor windings and the variable speed control provided by controller 26 and run power switching device 28 is bypassed. Motor 12 then runs at full speed.

Diode 30, known as a free wheeling diode, provides a path for the current in the windings of motor 12 when run power switching device 28 switches from on to off. Current then flows out of the motor windings at the bottom of motor 12 (as oriented in FIG. 1) through diode 30 and back into the motor windings at the top of motor 12 (as oriented in FIG. 1).

When trigger switch 16 is released to stop motor 12, main power contacts 18 of trigger switch 16 open with braking contacts 20 closing a split second later. (Bypass contacts 22, if they had been closed, open as trigger switch 16 is being released.) Closing braking contacts 20 shorts the motor windings of motor 12, braking motor 12.

Where the cordless power tool is not a variable speed tool, such as a saw, controller 26, run power switching device 28, bypass contacts 22 and diode 30 are eliminated. Braking contacts 20 operate in the same manner described above to brake motor 12.

Where the power resistor approach is used, a power resistor is connected in series with braking contacts 20.

Controller 26 and run power switching device 28 are illustratively packaged in the same package as trigger switch 16, as may be diode 30.

SUMMARY OF THE INVENTION

In accordance with an aspect of the invention, a braking circuit for a motor intermittently shorts the windings of the motor to brake the motor. The braking circuit is powered by back EMF generated by the motor when power is disconnected from the motor.

In an aspect of the invention, the braking circuit includes a storage capacitor charged by the back EMF generated by the motor and that provides power to the braking circuit.

In an aspect of the invention, a power tool includes the braking circuit that is used to brake a motor of the power tool.

In an aspect of the invention, the motor is a battery powered permanent magnet DC motor.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 2:
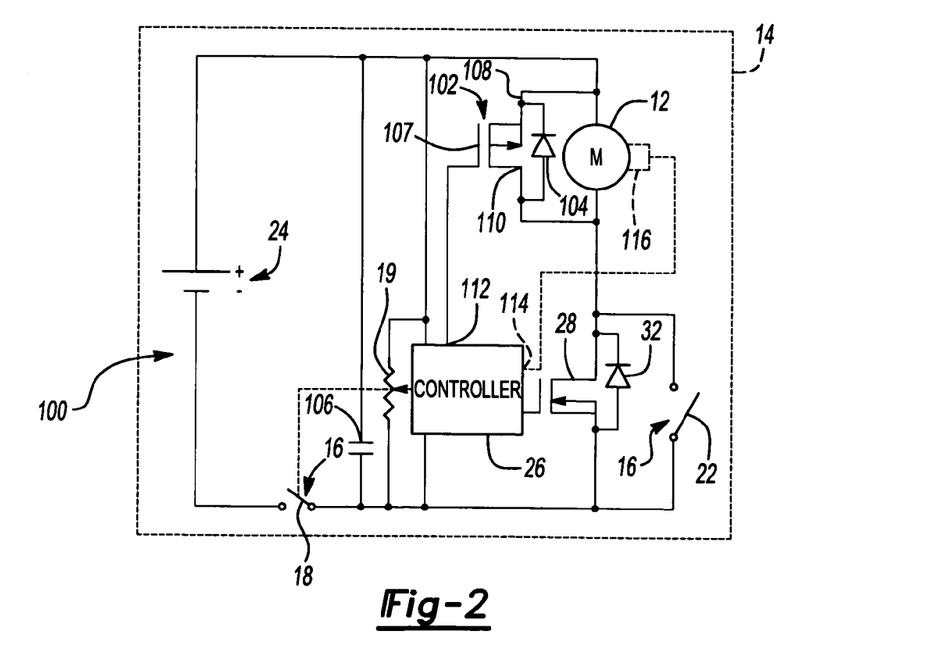
FIG. 2 is a schematic of a motor control circuit for braking a motor in accordance with the invention.

FIG. 2 shows a motor control circuit 100 for controlling power to a motor 12 that brakes motor 12 in accordance with the invention. Elements in common with FIG. 1 will be identified with like reference numerals and the discussion of motor control circuit 100 will focus on the differences between motor control circuit 100 and motor control circuit 10.

Motor control circuit 100 has a braking power switching device 102 connecting the motor windings of motor 12 in place of braking contacts 20 of trigger switch 16. Motor control circuit 100 also has a storage capacitor 106 coupled to controller 26. Diode 30 is eliminated.

Braking power switching device 102 is illustratively a P-channel MOSFET having an internal diode bridging its source and drain, identified as diode 104. Gate 107 of braking power switching device 102 is connected to an output 112 of controller 26. Source 108 of braking power switching device 102 is connected to the positive side of battery 24 and to one side of the windings of motor 12. Drain 110 of braking power switching device 102 is connected to the other side of the windings of motor 12, to the drain of run power switching device 28 and to the normally open side of bypass contacts 22 of trigger switch 16. Internal diode 104 of the MOSFET illustratively used as braking power switching device 102 replaces diode 30 (FIG. 1).

It should be understood that switching devices other than P-channel MOSFETs can be used as braking power switching device 102 provided that such devices have the necessary switching speed. Other types of switching devices that could be used for braking power switching device 102 are N-channel MOSFETS, triacs, SCRs, Darlington transistor pairs, IGBTs, other types of power semiconductor switching devices, and certain relays that have sufficient switching speed. In the event that a different type of switching device is used as braking power switching device 102, it may be necessary to add back diode 30 depending on the nature of this device and whether it has an internal diode.

In operation when motor 12 is running at less than full speed under control of run power switching device 28, internal diode 104 of braking power switching device 102 acts as the free-wheeling diode across the windings of motor 12 in the same manner as diode 30 of FIG. 1. When trigger switch 16 is released, main power contacts 18 of trigger switch 16 open, disconnecting power from battery 24 to controller 26 and motor 12. Storage capacitor 106 provides sufficient power to power controller 26 and braking power switching device 102 until motor 12 has been braked. Bypass contacts 22 are open and controller 26 turns run power switching device 28 off.

Controller 26 generates a control signal at output 112 that controls braking power switching device 102. This control signal is a pulsating signal that switches braking power switching device 102 on and off to intermittently short the windings of motor 12, braking motor 12. However, semiconductor switching devices, such as MOSFETs, have a small amount of internal resistance when they are switched on, so the short around the windings of motor 12 is not a true short, but rather has a small amount of resistance. This resistance, combined with the duty cycle, reduces the peak current that flows when the motor windings are shorted during the braking process. An external resistor, illustratively one having a low resistance, may also be connected in series with braking power switching device 102 to further control the current flow and thus the braking operation.

Controller 26 can be configured to provide pulsating output signals at output 112 to control the braking speed and braking current. For example, a free running pulsating signal can be provided, such as a pulse width modulated signal having a set frequency and duty cycle. Controller 26 can be configured to sense motor speed and/or back EMF and vary the frequency, duty cycle, or both of a pulse width modulated output signal output at output 112 in response thereto. In this aspect of the invention, controller 26 includes an input 114 coupled to a sensor 116 that senses at least one of motor speed and back EMF of motor 12. Controller 26 then utilizes the sensed input to control braking of motor 12 by varying at least one of the frequency and duty cycle of the pulse width modulated signal output by controller 26 at output 112. Controller 26 can also be configured to provide a square wave output signal (e.g., a pulse width modulated signal having a 50—50 duty cycle) or a sine wave.

In another aspect of the invention, main power contacts 18 of trigger switch 16 are not opened during braking of motor 12 and battery 24 remains connected, at least to the windings of motor 12. Upon release of trigger switch 16, controller 26 turns run power switching device 28 off and controls braking power switching device 102 in the manner described and then opens main power contacts 18 once motor 12 has been braked. Bypass contacts 22 are also opened, as described above. This allows for regenerative braking recharging battery 24 to some extent during braking of motor 12 with internal diode 32 of run power switching device 28 providing a current path from the negative terminal of battery 24 to one side of motor 12, the other side of motor 12 being coupled to the positive terminal of battery 24.

In an aspect of the invention, braking power switching device 102 is housed in the same switch package that houses trigger switch 16, controller 26 and run power switching device 28.

Where the motor 12 is utilized in a power tool is not a variable speed tool, controller 26 controls only braking power switching device 102 in the manner described and run power switching device 28, bypass contacts 22 and diode 30 (if present) are eliminated.

Figure 3:
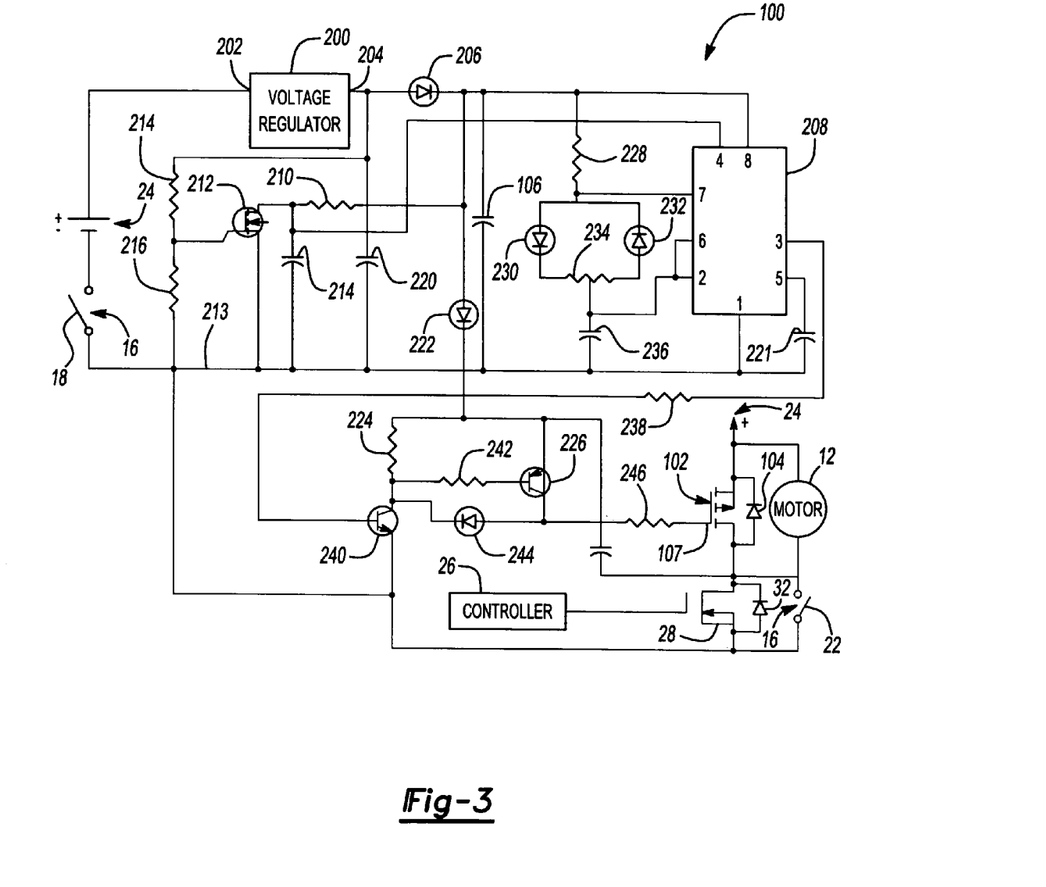
FIG. 3 is a more detailed schematic of the motor control circuit for braking a motor of FIG. 2.

FIG. 3 is a more detailed schematic of the motor control circuit 100 of FIG. 2 for controlling power to motor 12 that brakes motor 12 in accordance with the invention. As shown in FIG. 3, the positive terminal of battery 24 is connected to an input 202 of a nine volt regulator 200. An output 204 of nine volt regulator 200, which provides a positive rail, is coupled to the anode of a diode 206. The cathode of diode 206 is coupled to a power terminal, pin 8, of a timer 208, which is illustratively a LM555 timer. A common terminal, pin 1, of timer 208 is coupled to a switched common rail 213. The cathode of diode 206 is coupled to one side of capacitor 106, which is illustratively a 470 µF capacitor, and through a resistor 210 to the drain of a FET 212. The other side of capacitor 106 is coupled to switched common rail 213. The cathode of diode 206 is also coupled through a diode 222 to one side of a resistor 224 and the emitter of a transistor 226. The cathode of diode 206 is also coupled through a resistor 228 to pin 7 of timer 208 and to the anode of diode 230 and the cathode of diode 232. The cathode of diode 230 is coupled to one side of a potentiometer 234 and the anode of diode 232 is coupled to the other side of potentiometer 234. A wiper terminal of potentiometer 234 is coupled to pins 2 and 6 of timer 208 and through capacitor 236 to switched common rail 213.

A capacitor 218 is coupled between the drain of FET 212 and switched common rail 213. The drain of FET 212 is coupled to pin 4 of timer 208. The source of FET 212 is coupled to switched common rail 213 and the gate of FET 212 is coupled to a junction of resistors 214, 216. The other side of resistor 214 is coupled to output 204 of voltage regulator 200 and the other side of resistor 216 is coupled to switched common rail 213. Switched common rail 213 is coupled through main contacts 18 of trigger switch 16 to the negative terminal of battery 24. Capacitor 220 is coupled between output 204 of nine volt regulator 200 and switched common rail 213.

An output pin, pin 3, of timer 208 is coupled through a resistor 238 to a base of a transistor 240. A collector of transistor 240 is coupled to the other side of resistor 224 and through a resistor 242 to a base of transistor 226. An emitter of transistor 240 is coupled to switched common rail 213. A collector of transistor 226 is coupled to an anode of a diode 244 and through a resistor 246 to the gate of the FET that is illustratively braking power switching device 102. A cathode of diode 244 is coupled to the collector of transistor 240.

In operation, when main contacts 18 of trigger switch 16 are closed, the voltage divider formed by resistors 214, 216 turns on FET 212, which pulls down terminal 4 of timer 208 turning it off. Capacitor 106 is charged.

When main contacts 18 are opened, FET 212 turns off, allowing pin 4 of timer 208 to be pulled up, turning timer 208 on. Timer 208 outputs a pulse train at output pin 3 that, through transistors 240, 226, is provided to the gate of the FET that is braking power switching device 102, switching the FET on and off to brake motor 12. Potentiometer 234 adjusts the duty cycle and frequency of timer 208. Alternatively, the duty cycle and frequency of timer 208 can be set by replacing potentiometer 234 with a resistor or resistor network.

In the embodiment of FIG. 3, controller 26 includes the control circuit for motor 12 as described in FIG. 1. As discussed with reference to FIG. 2, controller 26 can include the motor braking circuit in which case the elements of FIG. 3 comprising the motor braking circuit would then be included in controller 26.

Figure 4A:
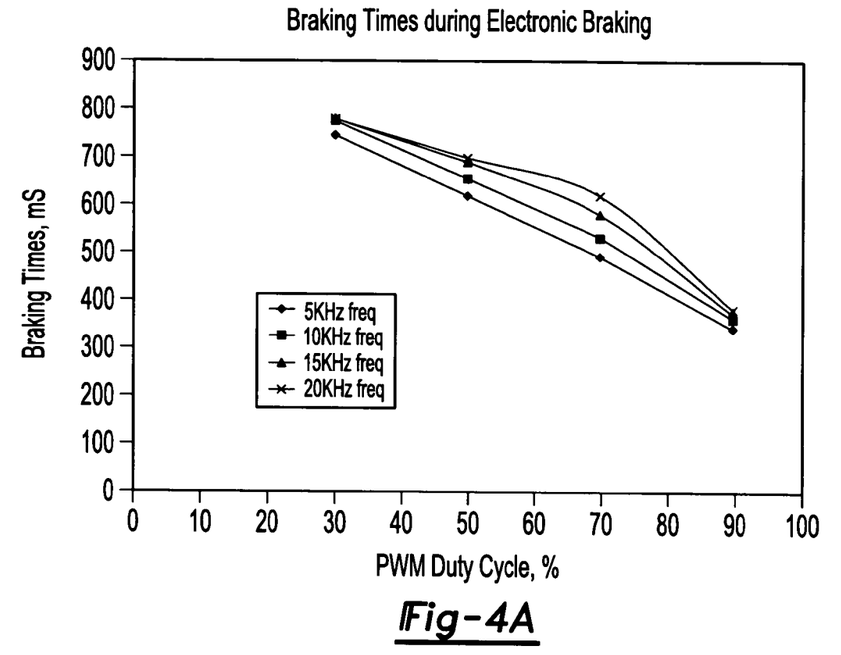
FIG. 4A is a graph showing braking times for various duty cycles and frequencies for the motor control circuit of FIG. 3.
Figure 4B:
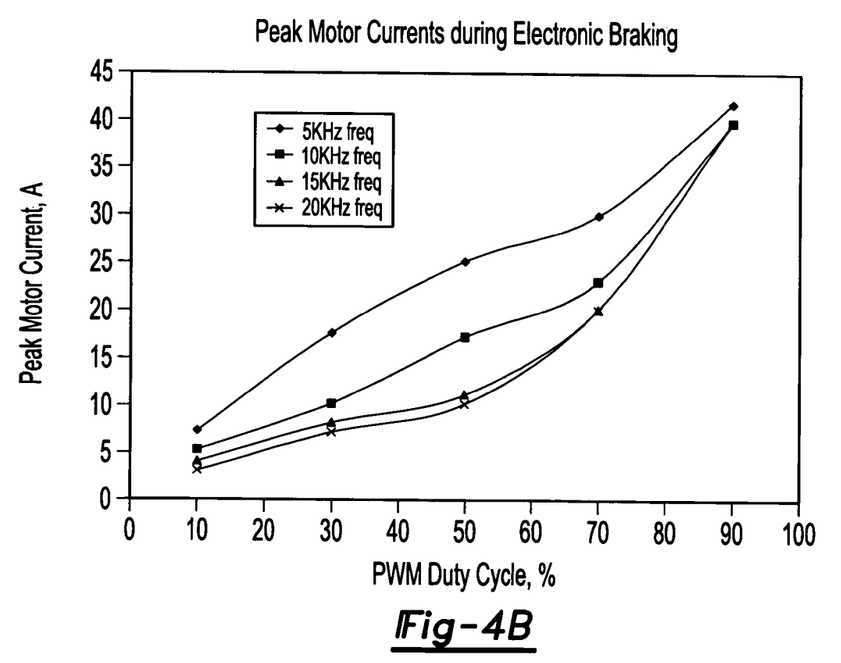
FIG. 4B is a graph showing peak motor currents during braking for various duty cycles and frequencies for the motor control circuit of FIG. 3.

FIG. 4A is a graph showing braking time for various duty cycles and frequencies and FIG. 4B is a graph showing peak motor currents for various duty cycles and frequencies for a power tool using the motor braking circuit 100 of FIG. 3 where the FET that is braking power switching device 102 is switched with a pulse width modulated signal with varying duty cycles and frequencies. The same power tool using the prior art braking circuit of FIG. 1 has a braking time of about 100 msec. and peak motor current during braking of about 75A.

It should be understood that while the above described motor braking has been described in the context of a cordless power tool having a DC motor powered by a battery, that it can also be utilized with a mains powered power tool having a DC motor that is powered by rectified AC provided by mains.

Figure 5A:
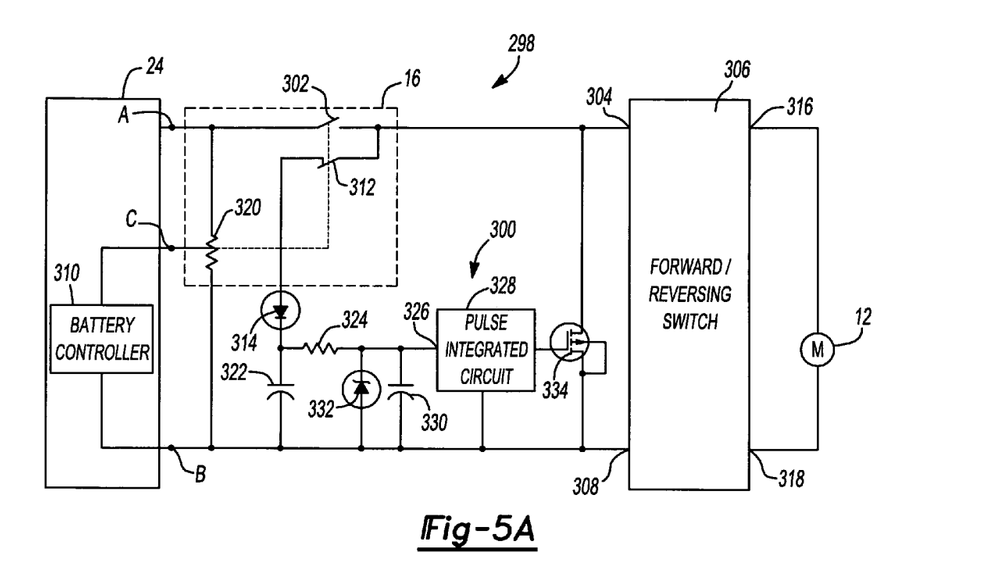
FIG. 5A and FIG. 5B are schematics of variations of the motor control circuit for braking a motor of FIG. 2.

FIG. 5A is a simplified schematic of a motor control circuit 298, which is a variation of the motor control circuit 100 of FIG. 2, having a braking circuit 300 for braking the motor 12. In this embodiment, the power tool is illustratively a cordless power tool and motor 12 is illustratively a permanent magnet DC motor having a wound armature and a field with permanent magnets. Elements in common with FIG. 2 will be identified with like reference numerals. In the embodiment shown in FIG. 5A, trigger switch 16 includes a first switch 302, which may illustratively be a mechanical switch, having one side coupled through a terminal A to the plus side of battery 24 and the other side coupled to a first power side contact 304 of a forward/reversing switch 306. A second power side contact 308 of forward/reversing switch 306 is coupled to the negative side of the battery 24 and a battery controller 310 included in the battery 24 through a terminal B. Generally, battery controller 310 controls the power supplied to motor 12. For example, battery controller 310 can control power to motor 12 by varying a PWM duty cycle of the power supplied to motor 12 through a semiconductor (not shown) within the battery 24. It should be understood, however, that motor control circuit 298 could have controller 26 as opposed to battery controller 310, or in addition to battery controller 310.

Trigger switch 16 also includes a second switch 312, which may illustratively be an electronic switch, having one side coupled to the first power side contact 304 of forward/reversing switch 306 and the other side coupled to the anode of a diode 314. A first side of motor 12 is coupled to a first motor side contact 316 of forward/reversing switch 306 and a second side of motor 12 is coupled to a second motor side contact 318 of forward/reversing switch 306. Trigger switch 16 also includes a potentiometer 320. One side of potentiometer 320 is coupled via terminal A to the plus side of battery 24 and the other side of potentiometer 320 is coupled through a terminal B to a common of battery 24. A wiper contact of potentiometer 320 is coupled through a terminal C to battery controller 310. The cathode of diode 314 is coupled to one side of capacitor 322 and through resistor 324 to a power terminal 326 of a controller which is illustratively a pulsing integrated circuit 328, which may illustratively be a LM555 timer. The other side of capacitor 322 is coupled to terminal B. Power terminal 326 is coupled through capacitor 330 to terminal B and to the cathode of a zener diode 332, the anode of zener diode 332 also being coupled to terminal B. An output of pulsing integrated circuit 328 is coupled to the switching input of a braking power switching device, which may illustratively be an electronic switch 334 such as a MOSFET with the output of pulsing integrated circuit 328 coupled to the gate of the MOSFET. As discussed above, other types of switching devices can be used for the braking power switching device, such as other types of FETs, triacs, SCRs, Darlington pairs, other types of semiconductor switching devices, and certain relays that have sufficient switching speed. Electronic switch 334 is coupled across the first and second power side contacts 304, 308 of forward/reversing switch 306 and thus across the windings of motor 12.

When trigger switch 16 is pulled, mechanical switch 302 closes and electronic switch 312 of trigger switch 16 opens. When trigger switch 16 is released, it opens mechanical switch 302, which breaks the current path from battery 24, and also closes electronic switch 312. Because motor 12 is rotating, back EMF is produced across the windings of motor 12. This power is coupled through electronic switch 312 to braking circuit 300 and is applied to capacitor 322 through diode 314 to charge capacitor 322. Capacitor 322 supplies power to pulsing integrated circuit 328 and once capacitor 322 is charged to a sufficient level, illustratively to the voltage of zener diode 332, pulsing integrated circuit 328 turns on and begins pulsing electronic switch 334, illustratively at a high frequency, causing electronic switch 334 to repeatedly turn on and off and intermittently short the windings of motor 12.

When electronic switch 334 turns on, current created by the positive back EMF of motor 12 flows through electronic switch 334 back into the windings of motor 12. This current generates a negative torque on motor 12 and slows it down. "Pulsing" this current to motor 12 by repeatedly switching electronic switch 334 on and off keeps the motor current from getting too high and saturating the permanent magnets of motor 12.

When trigger switch 16 is pulled again, electronic switch 312 opens breaking the current path to braking circuit 300, turning pulsing integrated circuit 328 off which turns electronic switch 334 off. Mechanical switch 302 is closed, allowing normal current flow into motor 12 for normal operation. Since electronic switch 334 is coupled across the windings of motor 12, if a suitable device is used for electronic switch 334, such as a MOSFET, it can function as a freewheeling diode during normal operation of motor 12.

Figure 5B:
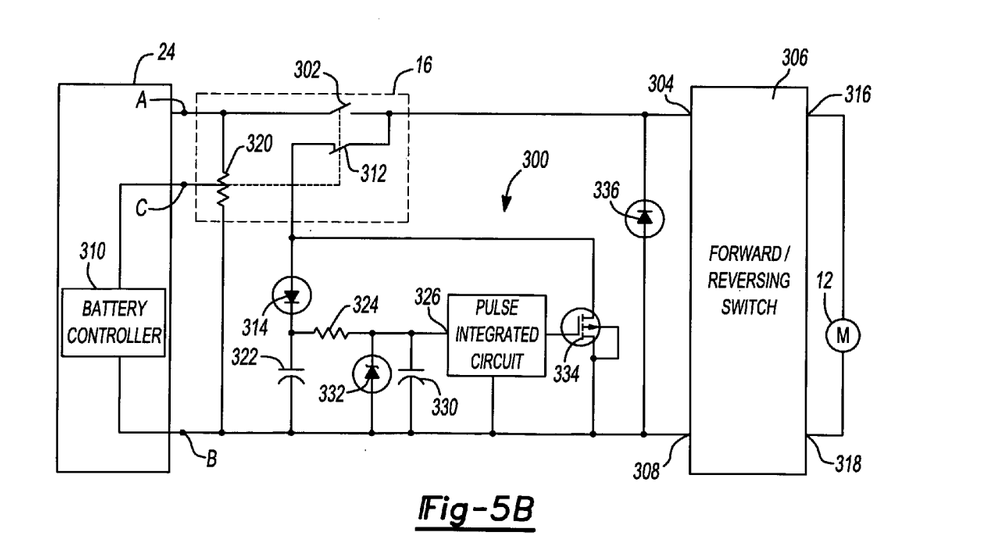

FIG. 5B is a simplified schematic showing a variation to the braking circuit 300 of FIG. 5A. Like elements will be identified with the same reference numerals and the discussion will focus on the differences. In FIG. 5B, a diode 336 is coupled across the windings of motor 12 (through forward/reversing switch 306) to act as the freewheeling device during normal operation of motor 12. One side of electronic switch 334 is then coupled to the junction of electronic switch 312 of trigger switch 16 and diode 314 instead of to the first power side contact 304 of forward/reversing switch 306. By coupling one side of electronic switch 334 to electronic switch 312 in this manner, power is disconnected to electronic switch 334 by the opening of electronic switch 312 when trigger switch 16 is pulled, which prevents the possibility of any shoot through from electronic switch 334 being actively powered when mechanical switch 302 is closed when trigger switch 16 is pulled.

An advantage of the braking circuit 300 is that the back EMF of motor 12 is used to power it. Thus, there is no need for circuitry to keep a braking circuit powered at all times. If braking circuit 300 is put into a cordless power tool, it is self-contained in the cordless power tool and there is thus no need for any communication between a battery pack, such as battery 24, and the cordless power tool to operate it.

Figure 6:
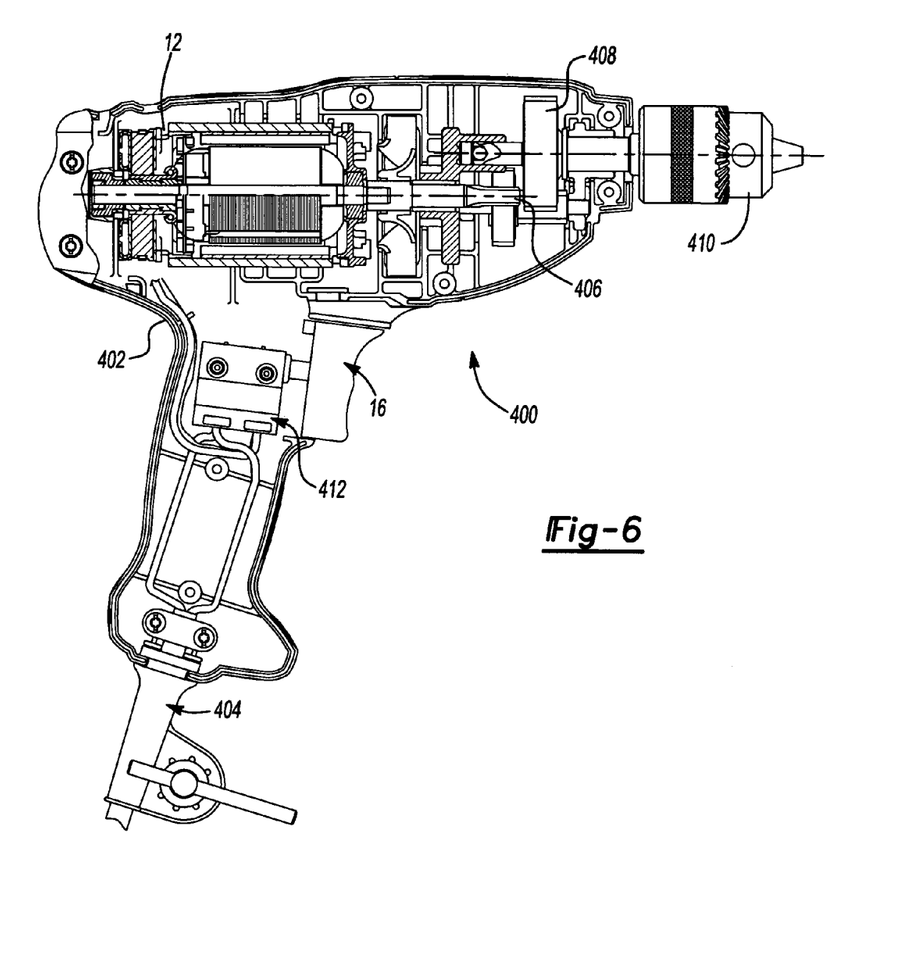
FIG. 6 is a perspective view of a power tool having the motor control circuit of any of FIG. 2, FIG. 5A and FIG. 5B.

Turning to FIG. 6, a power tool in accordance with the present invention is illustrated and designated with the reference numeral 400. The power tool 400 is illustrated as a drill; however, any type of power tool may be used with the motor of the present invention. The power tool 400 includes a housing 402 which surrounds a motor, such as motor 12. An activation member, such as switch 16, is coupled with the motor 12 as well as with a power source 404. The power source 404 is illustratively a battery when power tool 400 is a cordless power tool. When power tool 400 is a mains powered power tool, the power source illustratively includes a rectifier (not shown) that is connected to mains that provide AC. The rectifier rectifies the AC and provides DC to power the motor. The motor 12 is coupled with an output 406 which may include a transmission 408 and a chuck 410 to retain a tool (not shown) in the drill.

Switch 16, which may illustratively be a trigger switch as discussed, may illustratively be packaged in a module 412 that includes controller 26, which may illustratively include the above described motor control circuits 100 or 298 (with braking circuit 300). Thus, motor control circuit 100 or 298 for controlling power to motor 12 and that brakes motor 12 is packaged as part of the module that includes trigger switch 16. Alternatively, if battery controller 310 is used in lieu of controller 26, module 412 may then include only braking circuit 300.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for braking a motor, comprising:
    connecting power to a motor when a first switch is on and disconnecting power to the motor when the first switch is off;
    generating a pulsed output signal with a controller when the first switch is switched off to switch a braking power switching device coupled across windings of the motor on and off to brake the motor;
    charging a storage capacitor using back EMF generated by the motor when the first switch is switched off;
    providing power to the controller with the charged storage capacitor; and
    disconnecting power to the controller when the first switch is switched on.

2. The method of claim 1 including coupling the braking power switching device across the windings when the first switch is switched on and decoupling them from the windings when the first switch is switched off.

3. A method of braking a motor in a power tool, comprising:
    disconnecting power from the motor;

coupling a motor braking circuit to windings of the motor upon power to the motor being disconnected to power the motor braking circuit with back EMF generated by the motor after the power to the motor has been disconnected; and intermittently shorting the windings of the motor with the motor braking circuit to brake the motor upon disconnecting power to the motor.

4. The method of claim 3 wherein intermittently shorting the windings of the motor with the motor braking circuit includes repeatedly switching an electronic switch coupled across the windings of the motor on and off.

5. The method of claim 4 wherein powering the motor braking circuit with back EMF generated by the motor includes charging a storage capacitor with the back EMF and providing power to the motor braking circuit with the storage capacitor.

6. The method of claim 5 wherein repeatedly switching the electronic switch on and off includes generating a series of pulses with the motor braking circuit and pulsing an input of the electronic switch with the pulses to repeatedly switch the electronic switch on and off.

7. The method of claim 6 wherein generating the series of pulses with the motor braking circuit includes generating the series of pulses with a timer of the motor braking circuit.

8. The method of claim 7 wherein the electronic switch includes a triac, a SCR, a FET, an IGBT and a Darlington pair.

9. The method of claim 4 and further including connecting at least one side of the electronic switch to the motor windings when power to the motor is off and disconnecting the at least one side of the electronic switch to the motor windings when power to the motor is on.

10. The method of claim 9 wherein powering the motor braking circuit with back EMF generated by the motor includes charging a storage capacitor with the back EMF and providing power to the motor braking circuit with the storage capacitor.

11. The method of claim 10 including generating a series of pulses with the motor braking circuit and pulsing the electronic switch with the pulses to repeatedly switch the electronic switch on and off.

12. The method of claim 10 wherein the electronic switch includes at least one of a triac, a SCR, a FET, an IGBT and a Darlington pair.

13. The method of claim 3 including connecting power to the motor by turning a power switch on and disconnecting power from the motor by turning the power switch off.

14. The method of claim 13 including coupling the braking circuit to the windings of the motor when the power switch to couple the braking circuit to the windings of the motor with the power switch is off and to decouple the braking circuit to the windings when the power switch is on.

15. A method of braking a motor in a power tool, comprising:
disconnecting power from the motor;
coupling a motor braking circuit to windings of the motor upon power to the motor being disconnected to charge a storage capacitor of a motor braking circuit with back EMF generated by the motor after power to the motor has been disconnected, the storage capacitor providing power to the motor braking circuit; and
intermittently shorting the windings of the motor with the motor braking circuit to brake the motor upon power to the motor being disconnected.

16. The method of claim 15 wherein intermittently shorting the windings of the motor includes repeatedly switching an electronic switch coupled across the windings of the motor on and off by generating a series of pulses of with the motor braking circuit and pulsing an input of the electronic switch with the pulses to repeatedly switch the electronic switch on and off.

17. The method of claim 16 including turning a power switch on to connect power to the motor and decouple the motor braking circuit from the windings of the motor and turning the power switch off to disconnect power from the motor and couple the braking circuit to the windings of the motor.

18. A power tool, comprising:
a housing;
a motor disposed in the housing;
a motor braking circuit;
a power switch for connecting power to the motor and decoupling the motor braking circuit from windings of the motor when the power switch is on and disconnecting power to the motor and coupling the motor braking circuit to the windings of the motor when the power switch is off to power the motor braking circuit with back EMF generated by the motor; and
the motor braking circuit, when powered, intermittently shorting the windings of the motor to brake the motor.

19. The power tool of claim 18 wherein the motor braking circuit includes an braking power switching device coupled across the windings of the motor that is repeatedly turned on and off by the motor braking circuit to intermittently short the windings of the motor.

20. The power tool of claim 19 wherein the motor braking circuit includes a storage capacitor charged by the back EMF generated by the motor that provides power to the motor braking circuit.

21. The power tool of claim 20 wherein the braking power switching device includes an electronic switch and the motor braking circuit includes a timer having an output coupled to an input of the electronic switch, the timer generating a series of pulses that switches the electronic switch on and off.

22. The power tool of claim 21 wherein the electronic switch includes at least one of a triac, a SCR, a FET, an IGBT and a Darlington pair.

23. The power tool of claim 18 wherein the power switch includes first and second switches, the first switch connecting power to the motor when the power switch is on and disconnecting power from the motor when the power switch is off, the second switch coupling the motor braking circuit to the windings of the motor when the power switch is off and decoupling the motor braking circuit from the windings of the motor when the power switch is on.

24. The power tool of claim 19 wherein the power switch includes first and second switches, the first switch connecting power to the motor when the power switch is on and disconnecting power from the motor when the power switch is off, the second switch coupling the motor braking circuit to the windings of the motor when the power switch is off and decoupling the motor braking circuit from the windings of the motor when the power switch is on, at least one side of the braking power switching device coupled to the windings of the motor through the second switch so that the one side of the braking power switching device is coupled to the windings of the motor when the power switch is off and decoupled from the windings of the motor when the power switch is on.

25. The power tool of claim 24 and further including a diode coupled across the windings of the motor.

26. A power tool, comprising:
a housing;
a motor disposed in the housing;
a motor braking circuit;
a power switch for connecting power to the motor and decoupling the motor braking circuit from windings of the motor when the power switch is on and disconnecting power to the motor and coupling the motor braking circuit to the windings of the motor when the power switch is off to charge a storage capacitor of the motor braking circuit with back EMF generated by the motor; and
the motor braking circuit, when powered, intermittently shorting the windings of the motor to brake the motor.

27. The power tool of claim 26 wherein the motor braking circuit includes an electronic switch coupled across the windings of the motor that is repeatedly turned on and off by the motor braking circuit to intermittently short the windings of the motor.

28. The power tool of claim 27 wherein the power switch includes first and second switches, the first switch connecting power to the motor when the power switch is on and disconnecting power from the motor when the power switch is off, the second switch coupling the motor braking circuit to the windings of the motor when the power switch is off and decoupling the motor braking circuit from the windings of the motor when the power switch is on.

29. The power tool of claim 28 wherein at least one side of the electronic switch is coupled to the windings of the motor through the second switch so that the one side of the electronic switch is coupled to the windings of the motor when the power switch is off and decoupled from the windings of the motor when the power switch is on.

30. A motor control circuit, comprising:
a motor braking circuit;
a power switch for connecting power to a motor and decoupling the motor braking circuit from windings of the motor when the power switch is on and disconnecting power to the motor and coupling the motor braking circuit to the windings of the motor when the power switch is off to power the motor braking circuit with back EMF generated by the motor; and
the motor braking circuit, when powered, intermittently shorting the windings of the motor to brake the motor.

31. The circuit of claim 30 wherein the motor braking circuit includes an braking power switching device coupled across the windings of the motor that is repeatedly turned on and off by the motor braking circuit to intermittently short the windings of the motor.

32. The circuit of claim 31 wherein the motor braking circuit includes a storage capacitor charged by the back EMF generated by the motor that provides power to the motor braking circuit.

33. The circuit of claim 32 wherein the braking power switching device includes an electronic switch and the motor braking circuit includes a timer having an output coupled to an input of the electronic switch, the timer generating a series of pulses that switches the electronic switch on and off.

34. The circuit of claim 33 wherein the electronic switch includes at least one of a triac, a SCR, a FET, an IGBT and a Darlington pair.

35. The circuit of claim 30 wherein the power switch includes first and second switches, the first switch connecting power to the motor when the power switch is on and disconnecting power from the motor when the power switch is off, the second switch coupling the motor braking circuit to the windings of the motor when the power switch is off and decoupling the motor braking circuit from the windings of the motor when the power switch is on.

36. The circuit of claim 31 wherein the power switch includes first and second switches, the first switch connecting power to the motor when the power switch is on and disconnecting power from the motor when the power switch is off, the second switch coupling the motor braking circuit to the windings of the motor when the power switch is off and decoupling the motor braking circuit from the windings of the motor when the power switch is on, at least one side of the braking power switching device coupled to the windings of the motor through the second switch so that the one side of the braking power switching device is coupled to the windings of the motor when the power switch is off and decoupled from the windings of the motor when the power switch is on.

37. The power tool of claim 36 and further including a diode coupled across the windings of the motor.

38. A motor control circuit, comprising:
a motor braking circuit;
a power switch for connecting power to the motor and decoupling the motor braking circuit from windings of the motor when the power switch is on and disconnecting power to the motor and coupling the motor braking circuit to the windings of the motor when the power switch is off to charge a storage capacitor of the motor braking circuit with back EMF generated by the motor; and
the motor braking circuit, when powered, intermittently shorting the windings of the motor to brake the motor.

39. The circuit of claim 38 wherein the motor braking circuit includes an electronic switch coupled across the windings of the motor that is repeatedly turned on and off by the motor braking circuit to intermittently short the windings of the motor.

40. The power tool of claim 39 wherein the power switch includes first and second switches, the first switch connecting power to the motor when the power switch is on and disconnecting power from the motor when the power switch is off, the second switch coupling the motor braking circuit to the windings of the motor when the power switch is off and decoupling the motor braking circuit from the windings of the motor when the power switch is on.

41. The power tool of claim 40 wherein at least one side of the electronic switch is coupled to the windings of the motor through the second switch so that the one side of the electronic switch is coupled to the windings of the motor when the power switch is off and decoupled from the windings of the motor when the power switch is on.

42. The method of claim 4 wherein, wherein the electronic switch has a small amount of resistance to reduce peak current flow when the windings are shorted through the electronic switch.

43. The method of claim 16 wherein the electronic switch has a small amount of resistance to reduce peak current flow when the windings are shorted through the electronic switch.

44. The power tool of claim 18 wherein the braking power switching device has a small amount of resistance to reduce peak current flow when the windings are shorted through the braking power switching device.

45. The power tool of claim 27 wherein the electronic switch device has a small amount of resistance to reduce peak current flow when the windings are shorted through the electronic switch.

* * * * *